US009123144B2

(12) United States Patent
Smolyanskiy et al.

(10) Patent No.: US 9,123,144 B2
(45) Date of Patent: Sep. 1, 2015

(54) COMPUTING 3D SHAPE PARAMETERS FOR FACE ANIMATION

(75) Inventors: Nikolay Smolyanskiy, Seattle, WA (US); Christian F. Huitema, Clyde Hill, WA (US); Cha Zhang, Sammamish, WA (US); Lin Liang, Bellevue, WA (US); Sean Eron Anderson, Bellevue, WA (US); Zhengyou Zhang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 528 days.

(21) Appl. No.: 13/295,009

(22) Filed: Nov. 11, 2011

(65) Prior Publication Data

US 2013/0121526 A1 May 16, 2013

(51) Int. Cl.
*G06K 9/00* (2006.01)
*G06T 17/00* (2006.01)
*G06T 7/00* (2006.01)

(52) U.S. Cl.
CPC ............... *G06T 17/00* (2013.01); *G06T 7/0071* (2013.01); *G06T 2200/08* (2013.01); *G06T 2207/10016* (2013.01); *G06T 2207/30201* (2013.01)

(58) Field of Classification Search
USPC .................................. 382/154, 118; 345/419
See application file for complete search history.

(56) References Cited

U.S. PATENT DOCUMENTS

| 6,047,078 | A  | * | 4/2000 | Kang ............................ 382/107 |
| 6,862,374 | B1 | * | 3/2005 | Nagai et al. .................... 382/285 |
| 7,184,071 | B2 | * | 2/2007 | Chellappa et al. .............. 348/46 |
| 7,756,325 | B2 | * | 7/2010 | Vetter et al. .................... 382/154 |
| 8,131,063 | B2 | * | 3/2012 | Xiao et al. ..................... 382/154 |
| 8,208,717 | B2 | * | 6/2012 | Xiao et al. ..................... 382/154 |
| 8,238,642 | B2 | * | 8/2012 | Wu et al. ........................ 382/141 |
| 8,345,956 | B2 | * | 1/2013 | Ward et al. ..................... 382/154 |
| 8,467,596 | B2 | * | 6/2013 | Abadpour et al. ............. 382/151 |
| 2002/0106114 | A1 | * | 8/2002 | Yan et al. ....................... 382/118 |
| 2003/0072482 | A1 | * | 4/2003 | Brand ........................... 382/154 |
| 2003/0076990 | A1 | * | 4/2003 | Brand ........................... 382/154 |
| 2005/0031194 | A1 | * | 2/2005 | Lee et al. ....................... 382/154 |
| 2006/0013449 | A1 | * | 1/2006 | Marschner et al. ........... 382/118 |

(Continued)

OTHER PUBLICATIONS

Xin et al, Automatic 3D Face Modeling from Video, 2005 IEEE, pp. 1-7.*

(Continued)

*Primary Examiner* — Kathleen Y Dulaney
(74) *Attorney, Agent, or Firm* — Steve Wight; Judy Yee; Micky Minhas

(57) ABSTRACT

A three-dimensional shape parameter computation system and method for computing three-dimensional human head shape parameters from two-dimensional facial feature points. A series of images containing a user's face is captured. Embodiments of the system and method deduce the 3D parameters of the user's head by examining a series of captured images of the user over time and in a variety of head poses and facial expressions, and then computing an average. An energy function is constructed over a batch of frames containing 2D face feature points obtained from the captured images, and the energy function is minimized to solve for the head shape parameters valid for the batch of frames. Head pose parameters and facial expression and animation parameters can vary over each captured image in the batch of frames. In some embodiments this minimization is performed using a modified Gauss-Newton minimization technique using a single iteration.

20 Claims, 4 Drawing Sheets

(56) References Cited

U.S. PATENT DOCUMENTS

| | | | |
|---|---|---|---|
| 2006/0067573 A1* | 3/2006 | Parr et al. | 382/154 |
| 2006/0210148 A1* | 9/2006 | Nakashima | 382/154 |
| 2006/0227133 A1* | 10/2006 | Petrov et al. | 345/419 |
| 2007/0031028 A1* | 2/2007 | Vetter et al. | 382/154 |
| 2007/0091085 A1* | 4/2007 | Wang et al. | 345/420 |
| 2007/0122001 A1* | 5/2007 | Wang et al. | 382/103 |
| 2009/0129665 A1* | 5/2009 | Ishiyama | 382/154 |
| 2010/0013832 A1* | 1/2010 | Xiao et al. | 345/420 |
| 2010/0189342 A1* | 7/2010 | Parr et al. | 382/154 |
| 2010/0296724 A1* | 11/2010 | Chang et al. | 382/154 |
| 2011/0043610 A1* | 2/2011 | Ren et al. | 348/46 |
| 2011/0074930 A1* | 3/2011 | Hebert et al. | 348/47 |
| 2011/0075916 A1* | 3/2011 | Knothe et al. | 382/154 |
| 2012/0280974 A1* | 11/2012 | Wang et al. | 345/419 |
| 2013/0201187 A1* | 8/2013 | Tong et al. | 345/420 |

OTHER PUBLICATIONS

Zhou, et al., "AAM based Face Tracking with Temporal Matching and Face Segmentation", IEEE Conference on Computer Vision and Pattern Recognition (CVPR), Jun. 13-8, 2010, pp. 701-708.

Li, et al., "Modelling Faces Dynamically Across Views and Over Time", Proceedings of the Eighth IEEE International Conference on Computer Vision (ICCV), vol. 1, Jul. 7-14, 2001, pp. 554-559.

Wang, et al., "Face Animation Parameters Extraction and Tracking", Journal of Information & Computational Science 2:1, Jan. 13, 2005, pp. 147-150.

Blanz, et al., "A Morphable Model for the Synthesis of 3D Faces", Proceedings of the 26th annual conference on Computer graphics and interactive techniques (SIGGRAPH), Aug. 8-13, 1999, pp. 187-194.

Lozano, et al., "Real-time Visual Tracker by Stream Processing", Journal of Signal Processing Systems, vol. 57, Issue 2, Nov. 2009, pp. 21.

Yang, et al., "Real-Time 3-D Head Motion Estimation in Facial Image Coding", Multimedia Modeling, Oct. 12-15, 1998, pp. 50-51.

Huang, et al., "Fast Facial Fitting Based on Mixture Appearance Model with 3D Constraint", Chinese Conference on Pattern Recognition (CCPR), Oct. 21-23, 2010, pp. 1-5.

Matthews, et al., "Active Appearance Models revisited", International Journal of Computer Vision, Nov. 2004, vol. 60, No. 2, pp. 37.

Xiao, et al., "Real-time combined 2D+3D Active Appearance Models", IEEE Conference on Computer Vision and Pattern Recognition, Jun. 27-Jul. 2, 2004, pp. 535-542.

Ahlberg, J., "CANDIDE-3—an updated parameterized face", Report No. LiTH-ISY-R-2326, Dept. of Electrical Engineering, Linköping University, Sweden, Jan. 2001, pp. 3.

Cootes et al., "Active Appearance Models", Proceedings of the 5th European Conference on Computer Vision, Jun. 2-6, 1998, pp. 484-498.

Cootes et al., "Constrained Active Appearance Models", Proceedings of the 8th IEEE International Conference on Computer Vision, Jul. 7-14, 2001, pp. 748-754.

Scott et al., "Improving Appearance Model Matching Using Local Image Structure", Proceedings of the Conference on Information Processing in Medical Imaging, 2003, pp. 258-269.

Baker et al., "Lucas-Kanade 20 Years on: A Unifying Framework: Part 4", Technical Report CMU-RI-TR-04-14, Carnegie Mellon University, Robotics Institute, 2004.

Matthews et al., "The Template Update Problem", IEEE Transactions on Pattern Analysis and Machine Intelligence, vol. 26, Issue 6, Jun. 2004, pp. 810-815.

Lengagne et al., "3D Face Modeling from Stereo and Differential Constraints", Proceedings of the Third IEEE International Conference on Automatic Face and Gesture Recognition, Apr. 14-16, 1998, pp. 148-153.

Rusinkiewicz et al., "Efficient Variants of the ICP Algorithm", Proceedings of the Third International Conference on 3D Digital Imaging and Modeling, 2001, pp. 145-152.

Cai et al., "3D Deformable Face Tracking with a Commodity Depth Camera", Proceedings of the Eleventh European Conference on Computer Vision, Sep. 5-11, 2010, pp. 229-242.

Weise et al., "Realtime Performance-Based Facial Animation", ACM Transactions on Graphics, Proceedings of the ACM Siggraph 2011, vol. 30, Issue 4, Jul. 2011, Article 77.

Bouaziz et al., "Online Modeling for Realtime Facial Animation", ACM Transactions on Graphics, Proceedings of the ACM Siggraph 2013, vol. 32, Issue 4, Jul. 2013, Article 40.

Saragih et al., "Face Alignment Through Subspace Constrained Mean-Shifts", Proceedings of the Twelfth International Conference on Computer Vision, Sep. 29- Oct. 2, 2009, pp. 1034-1041.

Zhang et al., "Real Time Feature Based 3-D Deformable Face Tracking", Proceedings of the Tenth European Conference on Computer Vision, Oct. 12-16, 2008, pp. 720-732.

Cootes et al., "View-Based Active Appearance Models", Image and Vision Computing, vol. 20, Issues 9-10, Aug. 1, 2002, pp. 657-664.

Hartley et al., Multiple View Geometry in Computer Vision, Cambridge University Press, 2004.

Smolyanskiy et al., "Real-Time 3D Face Tracking Based on Active Appearance Model Constrained by Depth Data", in Image and Vision Computing, vol. 32, Issue 11, Nov. 2014, pp. 860-869.

* cited by examiner

COMPUTING 3D SHAPE PARAMETERS FOR FACE ANIMATION

BACKGROUND

Face tracking techniques are used to find features on a user's face, such as eyes, mouth, nose, and so forth. A camera captures frames containing the face, and the techniques examine the face to find the facial features. With some techniques, various two-dimensional (2D) feature points first are found on the face. Once the 2D feature points have been found, then 3D shape parameters can be found. These 3D shape parameters may include the 3D shape of a user's head, the 3D head pose, and the 3D position of the 2D points observed on the image frame.

One application of these face tracking techniques is to take the frames containing the user's face and model the facial expressions of the user. In other words, the way in which the user moves his face, such as lifting his eyebrows, smiling, and moving his mouth, is modeled. This modeling involves converting what is seen in the frames captured by the camera into movements of the face. This face model can be used to animate the user's face in a computing environment or deduce the meaning of a user's facial expression.

One difficulty, however, is that different people have different facial features. For example, some people have larger mouths than others, some have eyes that are far apart, and some have eyes that are close together. If the actual shape of the user's head is not taken into account, then the facial features of the user can easily be misread.

A 2D face alignment approach typically uses a face tracking system to obtain the 2D feature points from the captured frames. This system fits a model to the user's face to find its feature points. The model includes a base shape (or neutral face) plus a linear combination of deformations that represent head shape variations and facial expressions of the face.

Typical face tracking systems use a calibration step to compute the base shape and head shape deformation vectors that represent a user's specific head. The process involves asking a user to stare at the camera in certain position while keeping still, and the user is asked to look at the camera with a countenance that is devoid of expression. If the captured image of the user's face has any expression on it, then the user may be asked again to provide an expressionless image of his face. This process can be burdensome to the user.

One type of 2D face alignment approach is called an active appearance model (AAM). An AMM is a computer vision technique for tracking facial features in two dimensions. The AAM technique matches a statistical model of a shape and appearance of an object to a new image. The AAM is widely used for face recognition and tracking and for medical image interpretation. The AAM technique uses a difference between a current estimate of appearance and a target image to drive an optimization process.

In order to improve performance, the AAM technique can be constrained by a 3D face and head model. In this situation, the 3D face mask is represented as a linear combination of a neutral mask, face shape deformations and facial features deformations (for example mouth movements). This representation is given mathematically as:

$$S_{3DMask} = S_0 + \sum_{j=1}^{R} SU_j s_j + \sum_{j=1}^{Q} AU_j a_j \quad (1)$$

where $S_0$ is a neutral 3D mask, $SU_j$ and $S_j$ are j-th shape unit coefficient (SUs or 3D head shape parameters), $AU_j$ are its corresponding shape deformation basis vector (animation units (AUs) or facial expression parameters) and $a_j$ are j-th animation unit coefficient and its corresponding animation deformation basis vector.

Equation (1) is a linear combination of the "average" 3D mask for the entire human race and the deformation vectors that are learned statistically from Principal Component Analysis. This is based a theory that any faces can be represented as a linear combination of an average face plus some deformation basis vectors. The term, $S_{3DMask}$, represents a particular facial expression for a particular person. It is the sum of the average human face shape plus shape deformations plus animation deformations, expression deformations, or both.

Shape units (or 3D head shape parameters) and shape basis vectors represent variations in human head shapes. Animation units (or facial expression parameters) and animation basis vectors represent facial movements. Neutral 3D mask, its shape and animation deformation basis vectors are known and constant. They can be manually created by an artist to represent a set of 3D faces, or may be learned statistically from a training set by using algorithms like Principal Component Analysis.

A 2D to 3D AAM may use a 3D model to constrain energy minimization, produce realistic results for human faces, and to produce 3D tracking parameters (such as 3D head pose, 3D head shape parameters (SUs) and 3D facial expression parameters (AUs). This fitting process determines a set of SUs, AUs and the 3D head pose in addition to the 2D face parameters. Unfortunately, some 3D head shape and animation basis vectors may not be orthogonal and may be correlated with head pose changes.

For example, moving head up or down (also known as "pitching") may be explained by changing a pitch angle a little bit and moving eyebrows or mouth up or down or it can be explained only by changes in the head pose. This may lead to non-unique and incorrect results when the 2D to 3D AAM computes both the 2D and 3D (SU, AU, head pose) parameters in one combined energy minimization. Incorrectly computed 3D shape parameters are fed back to the AAM, which can contribute to a bad 2D fitting on subsequent video frames.

This problem can be greatly reduced if the correct 3D head and face shape parameters (SUs and scale) are known beforehand. In this case, the AAM fitting process uses fixed face shape parameters and computes only 2D face parameters, 3D head pose and 3D facial expression parameters.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the 3D shape parameter computation system and method compute updates to 3D head shape parameters from a plurality of 2D feature points fitted to a user's face. The 2D feature points are obtained from a series of images of the user's face captured by a camera and a face tracking system. Embodiments of the system and method can deduce a neutral face of the user from the series of images without the need for an image that actually contains the neutral face of the user. In fact, the more diversity of head poses and facial expressions that the series of images contain the faster the solution will converge. In other words, embodiments of the system and method can deduce the neutral face of the user by looking at a series of captured images of the user over time and in a variety of head poses and facial expressions, and then computing an average in an efficient manner.

Embodiments of the system and method use a camera (such as a depth-sensing camera) to capture a series of images containing the user's face. This series of images is over time and contains a variety of different head poses and facial expressions of the user. However, in some embodiments the series of images does not contain the user's neutral face. For each image, 2D feature points are fitted to the user's face in the image using a 2D face alignment technique. In some embodiments, this 2D face alignment technique is an active appearance model (AAM). Moreover, in some embodiments the 2D feature points also contain depth information obtained from depth-sensing camera. This depth information may include the distance from the camera to the user's face. In some case this additional information allows the solution to converge faster.

A desired batch size then is determined for a batch of frames. The batch size dictates how many captured images (or frames) will be included in the batch of frames. In some embodiments the batch size is 10 images, which means that the batch of frames will contain 10 images. A batch of frames then is generated to include a number of captured images set forth by the batch size as well as the sampling rate, image diversity, or both.

Each captured image in the batch of frames is separated by some temporal distance. In some embodiments, a sampling rate is defined that dictates how far apart in time the captured images are from each other. In some embodiments, the sampling rate is 3 frames per second. This means that adjacent captured images in the batch of frames are temporally separated by ⅓ of a second. In other embodiments, the captured images to include in the batch of frames are selected based on diversity. This may be head pose diversity, facial expression diversity, or both. In this embodiment, if the batch of frames already has the user looking up, down, and right, then it waits until an image is obtained that has the user looking left to include in the batch of frames. Similarly, if the batch of frames already has the user looking surprised, angry, and sad, then it may wait until an image is obtained of the user looking happy to include in the batch of frames.

An energy function is constructed over a batch of frames and then minimized to solve for the 3D shape parameter updates. The 3D head shape parameters are common or valid for the entire batch of frames and represent the shape of a particular tracked user and each of the images contained therein. On the other hand, the 2D feature points, 3D head pose parameters, and the 3D facial expression parameters (AUs) are allowed to vary for each image in the batch of frames. The energy function is constructed over the batch of frames and includes the unknown 3D head shape parameters, the 2D feature points, the 3D head pose parameters, and the 3D facial expression parameters. Moreover, the energy function is based on the squared difference between 2D feature points and a projected (to a camera plane) 3D head model, after it is transformed by a 3D head pose, 3D head shape deformations and facial expression deformations.

The energy function is minimized to solve for the 3D shape parameters updates for the batch of frames. The 3D shape parameter updates found are valid for the entire batch of frames, not just a single image in the batch. In addition, the facial expression parameters and 3D head pose parameters are found for each image in the batch of frames. The energy function of the batch of frames produces a system of equations that is solved using an energy minimization technique. In some embodiments, when the batch size is 10, each batch of frames produces a matrix containing about 100 x 100 elements.

In some embodiments this minimization is performed using a least square minimization technique, such as a modified Gauss-Newton minimization technique. The modified Gauss-Newton performs a single iteration of the minimization technique to obtain the 3D shape parameter updates. This is done since the energy function in this case is convex and so one step of Gauss-Newton nearly finds its minimum. This allows the 3D head shape parameters to be updated in real time. After the 3D head shape parameter updates are computed from the energy minimization, the current 3D head shape parameters are updated by adding the computed updates to them.

Once the 3D head shape parameters are found from the compute update for the batch of frames, a subsequent batch of frames is generated and the updates for 3D head shape parameters for that subsequent batch of frames is computed. Images in a subsequent batch of frames contains are later in time that image in the previous batch of frames. Current 3D head shape parameters are updated by mixing them together with new 3D head shape parameters. In other words, embodiments of the system and method compute a shape parameter difference (or computed update), and the new 3D head shape parameters are obtained by mixing the old 3D head shape parameters plus the shape parameter difference. Thus, for each batch of frames a system of equations is solved, and the energy minimization gives updates of the 3D head shape parameters for the particular batch of frames.

In some embodiments this process of generating new batches of frames and minimizing an energy function to solve for updates to the associated 3D head shape parameters continues until a point is reached where the head pose and the facial expression parameters are changing for each frame, but the 3D head shape parameters are constant. In other embodiments, the process continues until a threshold is reached in the shape parameter difference. In still other embodiments, the process continues until embodiments of the system and method are terminated. Moreover, each time the 3D head shape parameters are updated they are provided to the face tracking system to provide improvements in the tracking of the user's face. Thus, the model of the user's face as well as the face tracking of the user's face improves over time.

It should be noted that alternative embodiments are possible, and steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of embodiments of a 3D shape parameter computation system and method reference is made to the accompanying drawings, which form a part thereof, and in which is shown by way of illustration a specific example whereby embodiments of the 3D shape parameter computation system and method may be practiced. It is to be understood that other embodiments may be utilized and structural changes may be made without departing from the scope of the claimed subject matter.

I. System Overview

Embodiments of the 3D shape parameter computation system and method compute update to 3D head shape parameters from 2D feature points obtained from images captured over a period of time. The dimension of the problem is lowered from 3D to 2D because 2D feature points are used instead of image pixels. This means there are fewer data points to work with, as image pixels are more numerous. This reduces the computational complexity considerably and allows the 3D head shape parameter updates to be computed in real time.

Figure 1:
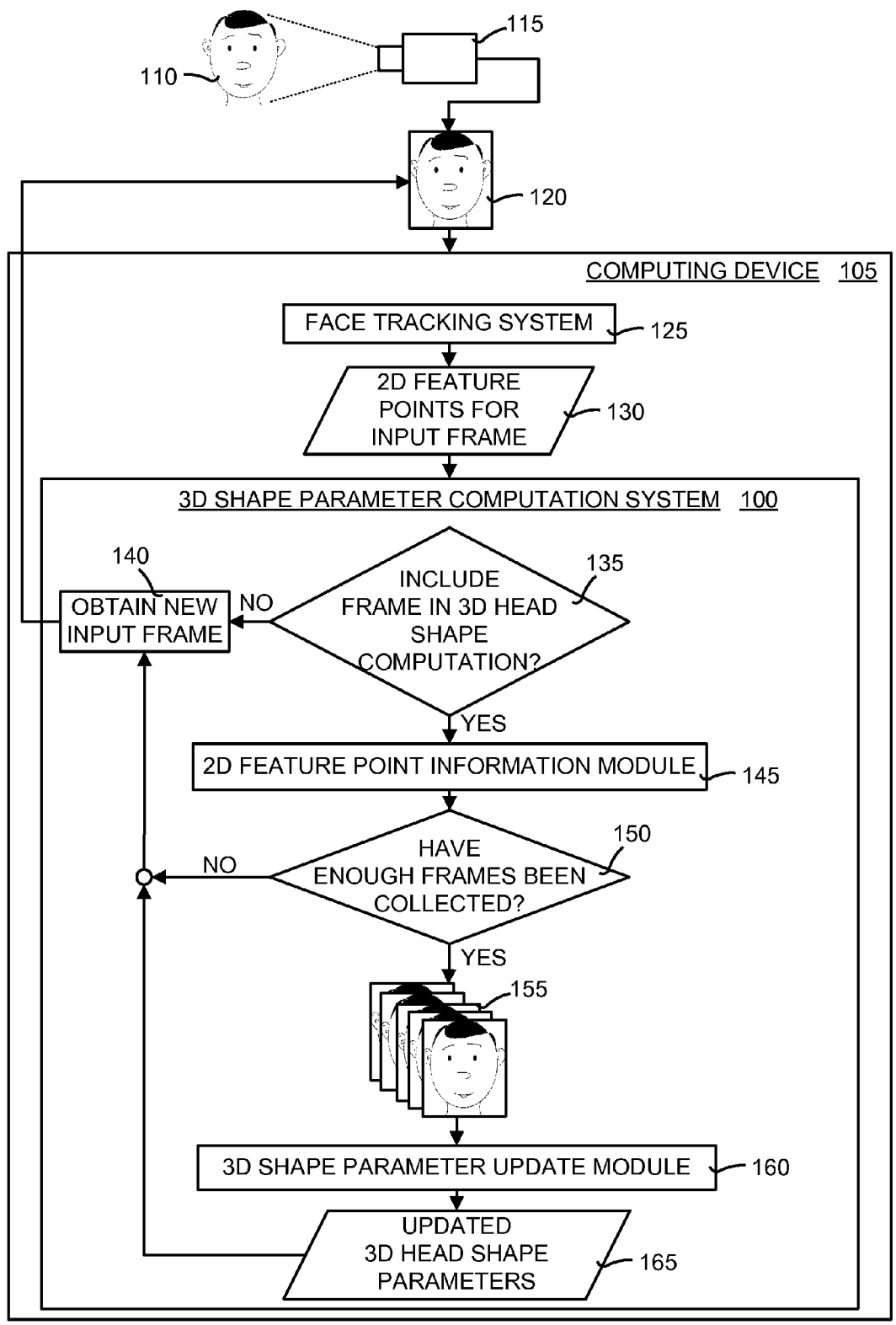
FIG. 1 is a block diagram illustrating a general overview of embodiments of the 3D shape parameter computation system and method implemented in a computing environment.

FIG. 1 is a block diagram illustrating a general overview of embodiments of the 3D shape parameter computation system 100 and method implemented in a computing environment. In particular, embodiments of the 3D shape parameter computation system 100 and method are shown implemented on a computing device 105. The computing device 105 may be virtually any device that contains a processor, such as a desktop computer, notebook computer, and mobile phone.

Embodiments of the 3D shape parameter computation system 100 and method capture a user's face 110 using a camera 115 to obtain an input frame 120 containing the user's face 110. In some embodiments the camera 115 is a depth-sensing camera. A face tracking system 120 (which includes a 2D face alignment technique) is run over the input frame 120 to produce 2D feature points for the input frame 130.

A determination then is made as to whether to include the input frame 120 in the 3D head shape computation 135. As explained below, this determination may be based on a numbers of criteria. If not, then a new frame is obtained 140 and the process is run again over the new frame. Otherwise, embodiments of a 2D feature point information module 145 process the input frame 120. This processing by embodiments of the 2D feature point information module 145 adds information from the input frame to corresponding matrices. The information from each input frame 120 is added to the matrices by embodiments of the 2D feature point information module 145.

A determination then is made as to whether enough frames have been collected 150 to generate a batch of frames 155. If not, then a new frame is obtained 140 and the process is run again over the new frame. Otherwise, there are enough frames to generate the batch of frames 155. This batch of frame is processed by a 3D shape parameter update module 160 to obtain the 3D head shape parameter update. This update is used to obtain updated 3D head shape parameters 165 for the batch of frames. This process is repeated such that new input frames are selected for inclusion in a new batch of frames that is different from the previous batch of frames. Moreover, periodically the updated 3D head shape parameters are sent to the face tracking system 125 to aid in the tracking of the user's face 110.

II. Operational Overview

Figure 2:
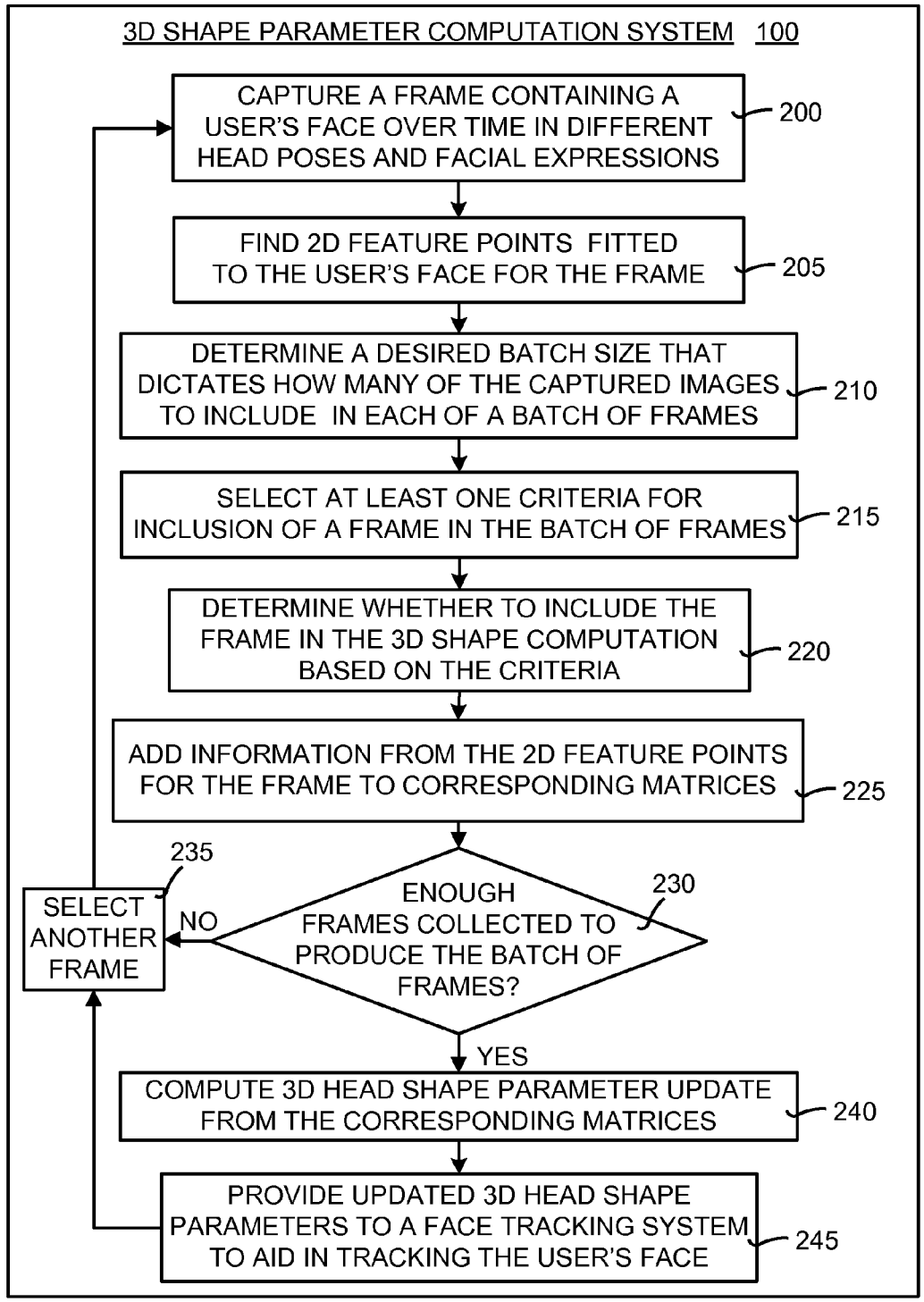
FIG. 2 is a flow diagram illustrating the general operation of embodiments of the 3D shape parameter computation system and method shown in FIG. 1.

FIG. 2 is a flow diagram illustrating the general operation of embodiments of the 3D shape parameter computation system 100 and method shown in FIG. 1. As shown in FIG. 2, the operation of embodiments of the 3D shape parameter computation method begins by capturing an input frame 120 containing a user's face 110 (box 200). Over time, the input frames include the user's face in different head poses and having different facial expressions. However, the input frame 120 does not include a neutral face of the user (or a neutral facial expression of the user). This is because embodiments of the 3D shape parameter computation system 100 and method do not require the user to provide a neutral image, and in fact converge faster to the 3D shape parameters when a variety of expressions of the user's face 110 are contained in the captured images.

For each input frame 120, embodiments of the 3D shape parameter computation system 100 and method assume that the image is mapped to a 3D face model of the user's face. This 3D face model is described in detail below. Embodiments of the system 100 and method attempt to find the most likely neutral face of the user by doing the computation of not just a single input frame 120, but a set of images taken together (called a batch a frames 155). For the batch of frames 155, embodiments of the system 100 and method find updates to the 3D head shape parameters that explain the shape of the user's face 110.

Next, embodiments of the 3D shape parameter computation system 100 and method find 2D feature points fitted to the user's face 110 for the input frame 120 (box 205). This is done using a 2D face alignment technique, such as the AAM. The 2D feature points are computed based on image information for each of the input frames in a batch of frames. As explained in detail below, these 2D feature points are used to compute updates for the 3D head shape parameters. This can be done in real time.

A desired batch size dictates the number of (or how many) input frames (or captured images) will be included in each of the batches of frames (box 210). In some embodiments, the batch size is 10, such that 10 captured images are used in each batch of frames. These 10 captured images not sequentially but have some temporal distance between them, so as to provide greater probability that they contain different head poses. The more variety that is contained in the captured images, the faster the computation of updates for the 3D head shape parameters will converge. The temporal distance between each of the captured images is called the sampling rate.

Embodiments of the system 100 and method also select at least one criterion for inclusion of an input frame in the batch of frames 155 (box 215). This criterion includes using different head poses, or whether there is a good face alignment. Moreover, often it is desirable to have a good temporal separation between captured images so that the images will contain the user's face in a variety of head poses (such as looking up, down, left, and right) and facial expressions. In some embodiments the sampling rate is 3 frames every second, or one-third of a second apart. In some embodiments, this criterion is based on diversity. In other words, images are selected so as to maximize the diversity of head poses and facial expressions that are contained in the batch of frames 155.

Next, a determination is made as to whether to include the input frame 120 in the 3D head shape computation based on the criteria (box 220). Information obtained from the 2D feature points for the input frame 130 is added to corresponding matrices (box 225). As explained in detail below, these matrices may include Hessian matrices and steepest descent matrices (or an information vector).

Next, a determination is made as to whether enough frames have been collected to produce the batch of frames 155 (box 230). This determination is based on the batch size. If not, then embodiments of the system 100 and method select another frame (box 235). This means that a new input frame is selected that is later in time from the previous input frame. If enough frames have been collected to produce the batch of frames 155, then the 3D head shape parameter update is computed from the corresponding matrices described above (box 240). An updated 3D head shape parameter is obtained and provided to the face tracking system 125 in order to aid in the tracking of the user's face (box 245).

Embodiments of the 3D shape parameter computation system 100 and method continue this process using new batches of frames. This means that a new batch of frames is generated containing different input frames that are later in time than the previous batch of frames. A 3D head shape parameter update that is common to or valid for this new batch of frames is computed and used to update the shape parameters. This process continues until either a threshold difference in the 3D head shape parameter updates is met, or until the embodiments of the system 100 and method are terminated. Each time the 3D head shape parameters are updated, they are provided to the face tracking system 125 to provide improvements in the tracking of the user's face 110.

In some embodiments, when the batch size is 10, each batch of frames produces a matrix containing about 100×100 elements. Embodiments of the system 100 and method solve this system of equations using a least squares minimization technique to find the 3D head shape parameter update that is common or valid for the 10 frames. Then the current 3D head shape parameters are obtained by adding them to old 3D head shape parameters to obtain new 3D head shape parameters. More specifically, embodiments of the system 100 and method compute a 3D head shape parameter update, and the new 3D head shape parameters are obtained by adding the old 3D head shape parameters plus the update.

For each batch of frames, a system of equations is solved, and the energy minimization gives the 3D head shape parameter update for the batch of frames 155. In some embodiments, this process is continued until the 3D head shape parameter update drops below some threshold. In other embodiments, the process continues in case something changes and new information is obtained that was not seen previously. Embodiments of the system 100 and method then process the next batch of frames. These updates then are mixed with the current 3D head shape parameters to obtained updated 3D head shape parameters. Each time the 3D shape parameters are updated a new 3D shape of the user's face is computed. This updated 3D face shape is used by the face tracking system 120. This means the face tracking improves over time.

III. Operational Details

The operational details of embodiments of the 3D shape parameter computation system 100 and method will now be discussed. This includes the operation of embodiments of the 3D shape parameter update module 160. Moreover, the mathematical details of embodiments of the 3D shape parameter update module 160 will be presented.

III.A. 3D Face Model Having a Set of Vertices and Triangles

Embodiments of the 3D shape parameter computation system 100 and method use a face model to represent the user's face. This face model can be used in face animation, where the user's face and expressions from the user's face are animated on a computer. Embodiments of the system and method represent a face by a polygonal surface. This can be done because of the real-time efficiency of modern graphics hardware. The polygonal surface is typically formed from a triangular mesh. The user's face then is determined by the 3D coordinates of the vertices of the triangles, which can be obtained by using 3D digitizers, laser scanners, or computer vision techniques.

If the coordinates of the vertices are treated as free parameters, meaning that they can be any values, then the number of unknowns is quite large. This makes face modeling difficult (because of the large amount of data that is handled). This difficultly in face modeling can render the face animation intractable.

One way around this problem is to notice that in a general sense most human faces look similar to each other. For example, most human faces contain two eyes above a nose, with a mouth below the nose. Using this concept, it can be seen that the number of degrees of freedom needed to define a wide range of faces is limited. Limiting the values that the coordinates of the vertices can take makes the face modeling problem solvable.

One way to represent a user's face is as a linear combination of a neutral (or "average") face and some number of face deformations. The average face is an average face for a human race without any expressions. In this context, a face metric is a vector that linearly deforms the neutral face in a certain way. A first face metric can be used to change the shape of the user's head and some facial parts. Such a metric is called a "shape unit," (or "SU" or 3D head shape parameter). For example, the SUs can be used to make the head wider, longer, or make the nose bigger. A second face metric can be used to describe facial expressions like a smile, frown, anger, or surprise. Such a metric is called an "animation unit," (or "AU" or facial expression parameter).

III.B. 3D Head Shape Parameter Update Module

The 3D shape parameter computation system 100 and method collects 2D facial feature points for M number of input frames. Embodiments of the system 100 and method then use the 3D shape parameter update module 160 to minimize an energy function obtained from parameters from the batch of frames. The energy function uses one common set of 3D head shape parameters for all frames and allows different 3D head poses and animation sets for each frame.

The energy minimization process produces an update to a set of 3D head shape parameters that explains the face shape on all captured images in a particular batch of frames. In some embodiments of the 3D shape parameter update module 160, the energy minimization is performed using a single iteration of the Gauss-Newton algorithm. As explained in detail below, this single iteration generally yields the minima. At this point the function is mostly well shaped and convex. Then embodiments of the module 160 generate a new batch of frames and repeat these process actions. The new batch of frames may contain previously unseen poses, which may improve the 3D head shape parameters. Embodiments of the module 160 converge to an update to a set of 3D head shape parameters that can explain the face after processing one or more batches of frames.

Figure 3:
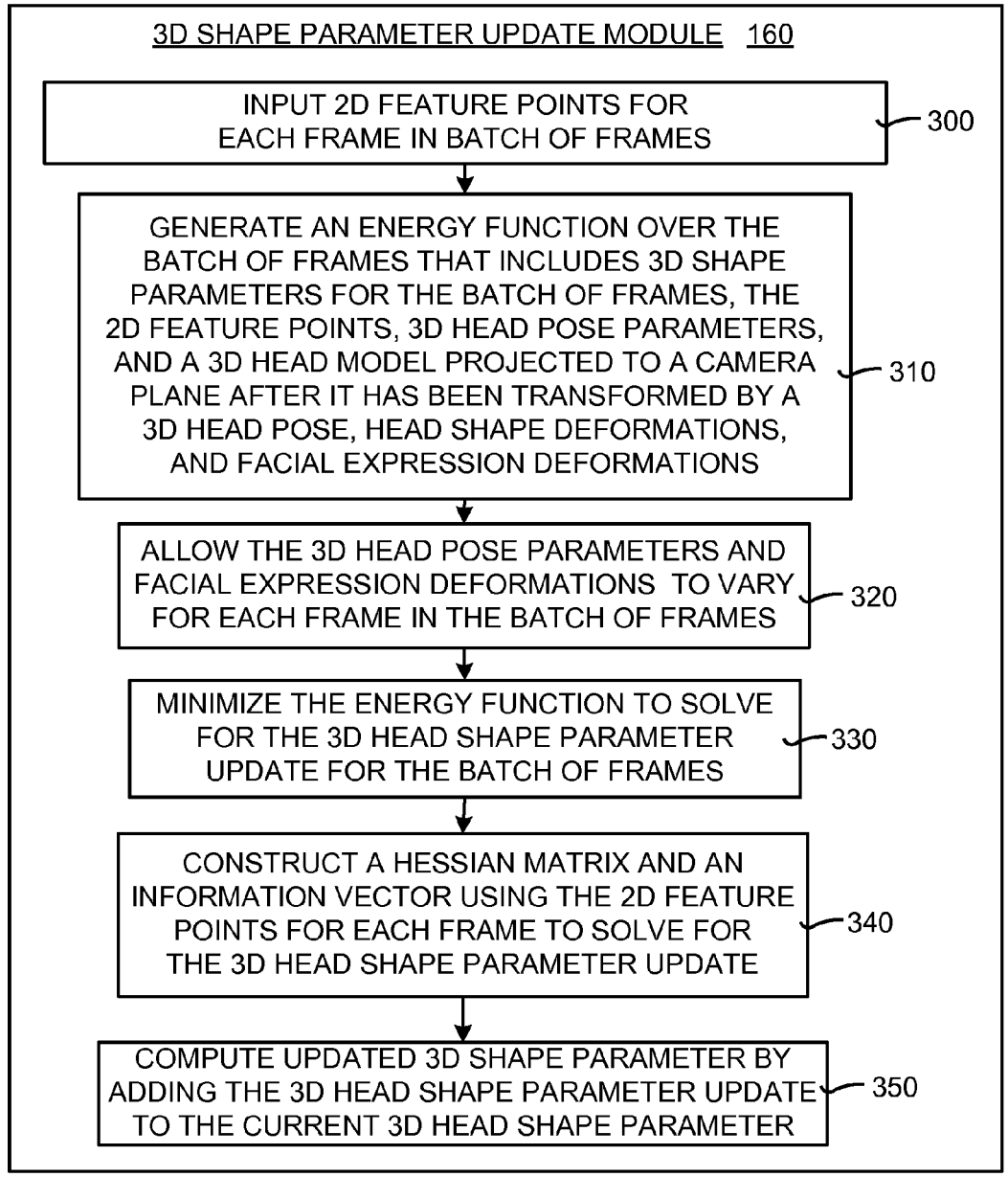
FIG. 3 is a flow diagram illustrating the operational details of embodiments of the 3D shape parameter update module shown in FIG. 1.

FIG. 3 is a flow diagram illustrating the operational details of embodiments of the 3D shape parameter update module 160 shown in FIG. 1. The operation begins by inputting the 2D feature points for each frame in a batch of frames (box 300). In particular, embodiments of the 3D shape parameter update module 160 collect 2D feature points for M number of captured images.

Next, the module 140 generates an energy function over the batch of frames (box 310). This energy function includes 3D shape parameters for the batch of frames, the 2D feature points for each of the input frame in the batch of frames, and the 3D head pose parameters The energy function also includes a difference between 2D points and projected 3D model points (projected to the camera plane), head shape deformations, and facial expression deformations.

Using the energy function, the module 160 finds a 3D head shape parameter update that is common to the corresponding batch of frames and that can explain the shape of the user's head in each of the frames in the batch of frames. The 3D head pose parameters and the facial expression deformations can vary for each of the frames in the batch of frame (box 320). Thus, there are 3D head pose parameters and AU (or facial expression parameters) for each frame in the batch of frames. However, there is only one 3D head shape parameter update associated with the batch of frames.

The energy function then is minimized to solve for the 3D head shape parameter update for the batch of frames (box 330). Moreover, as explained below, a Hessian matrix and an information vector are constructed using the 2D feature points for each frame to solve for the 3D head shape parameter update (box 340).

Mathematically, the following energy function is minimized:

$$E = \sum_{k=1}^{M} \sum_{i=1}^{N} (S_i^{2D}(k) - \text{Proj}(S_i^{3D}(R(k), T(k), AU(k), SU')))^2 + w_1 \sum_{k=1}^{M} (\text{depthZ}(k) - T_z(k))^2 + w_2 \sum_{k=1}^{M} (AU(k))^2 + w_3 \sum_{k=1}^{M} (SU_{old} - SU)^2 \quad (2)$$

where:

k=1 . . . M—a number of a captured image (or frame number);

i=1 . . . N—a point index;

$S_i^{2D}(k)$—i-th point of a 2D shape computed for frame k by the 2D face alignment module 130;

$s_i^{3D}(k)$—i-th point of a 3D mask in camera space computed for captured image k;

$R(k)=[\theta_x, \theta_y, \theta_z]^T$—3D rotation angles around X,Y,Z computed for captured image k;

$T(k)=[T_x, T_y, T_z]^T$—3D translation in X,Y,Z computed for captured image k;

$AU(k)=[AU_1, AU_2, \ldots, AU_Q]^T$—Q animation units computed for captured image k;

$SU=[s, SU_1, SU_2, \ldots, SU_R]^T$—a vector of 3D scale (s parameter) and R shape units (SUs) common for all M captured images in this energy function. This vector describes the facial shape in 3D;

depthZ(k)—distance to the tracked face for captured image k provided by a depth sensing camera; and $W_1, W_2, W_3$—weights of corresponding constraints.

In Equation (2), E represents the energy function that embodiments of the 3D shape parameter update module 160 are trying to minimize in order to find the SUs (or 3D head shape parameters). This energy function is formed over a batch of frames. In some embodiments, the batch of frames contains 10 frames (or images) containing the captured face of the user 110. The energy function in Equation (2) computes SUs that are common for each of the captured images in the batch of frames. It also minimizes and finds expressions for each captured image separately, such as the Aus (or facial expression parameters), which are different for each input frame.

Referring to Equation (2), the first term of the energy function is the 2D feature points minus the projected 3D shape of the user's face. The second, third, and fourth terms include the weights, which are constraints that make the solution stable. The first weight, $W_1$, says that the distance to the face is close to what is observed from the depth-sensing camera. The second weight, $W_2$, adds stability to the solution. The third weight, $W_3$, constrains the solution such that the newly-computed shape will not be far from the old computed shape. This also adds stability to the solution.

In the first (or main) term of the energy function in Equation (2), the projected 3D shape is a perspective projection. Embodiments of the 3D shape parameter update module 160 project a 3D shape, which is defined in Equation (1), and add 3D rotation, 3D translation, and the SUs and AUs. Generally speaking, it is the user's face 110 placed in a camera space.

In addition, embodiments of the 3D shape parameter update module 160 compute the 3D position of the face and rotation. In other words, it computes rotation, translation, and the scale of the user's face relative to the 3D face model. In terms of the 3D face model described above, it computes the movement of the set of vertices and triangles for the user's face 110 that are represented by the SUs and AUs.

Moreover, $$S_i^{3D}(k) = sR(k)\left(S_{0_i} + \sum_{j=1}^{R} SU_j S_{ij} + \sum_{j=1}^{Q} AU_j(k) A_{ij}\right) + T \quad (3)$$

is a vertex of a 3D face mask in camera space, where:

R(k) is a rotation matrix computed for captured image k;

T(k) is a translation vector for captured image k;

s is scale common for all M captured images;

$S_0$ is a constant neutral 3D mask; and $S_{ij}, A_{ij}$ are constant shape and animation parameter vectors for i-th vertice of the 3D mask that correspond to j-th SU or AU values.

Equation (3) explains more in detail how embodiments of the 3D shape parameter update module 160 compute each point of the 3D shape and obtain vertices for the 3D face shape of the user. Generally, embodiments of the module 160 are given the scale and then multiply the scale by rotation. This 3D shape is transformed in model space, and then translation is added. Equation (3) makes clear how the vertices of the 3D shape are transformed. The 3D mask defined in the model space is deformed, rotated, and translated into world space so that it fits the user's face that was observed from the 2D image contained in a frame. This transformation from model space to camera space yields the vertices of the face model.

In addition, $$\text{Proj}(x, y, z) = \begin{cases} \dfrac{fx}{z} + \dfrac{\text{frame width}}{2}, \\ -\dfrac{fy}{z} + \dfrac{\text{frame height}}{2}, \end{cases} \quad (4)$$

is the perspective projection function that was used in Equation (2).

Note that the energy function as set forth in Equation (2) includes the following:
1. a main term responsible for fitting 3D head pose parameters, animation units, scale and shape units based on observed 2D points computed by the 2D face alignment module 130;
2. a depth constraint that is responsible for limiting $T_z$ to be as close as possible to the camera's distance to the tracked users' face 110;
3. an AU change minimization constraint that forces the optimization process to use mostly SUs and scale to explain a set of 2D points with 3D mask; and
4. a Tikhonov regularization constraint that makes this non-linear optimization numerically stable and minimizes changes in SUs and scale values. This constraint adds stability by "smoothing" SU and scale updates.

The energy function of Equation (2) is minimized over a block of M captured images to compute the shape parameter difference, $\Delta SU$, or updates to the common scale and SUs for those captured frames. The 3D pose parameters and AU values are allowed to vary for each captured image in the energy function. Once the shape parameter difference, $\Delta SV$, is known, embodiments of the module 160 incorporate them into the previously known scale and SU parameters. Mathematically, this can be written as follows:

$$SU_{new} = SU_{old} + \mu \Delta SU \quad (5)$$

where $\mu$ is an update weight that takes values in $0 \ldots 1$ range. In some embodiments this value is set to be 1.0.

Equation (5) set forth how embodiments of the 3D shape parameter update module 160 mix updates of SUs with the previous (or old) SUs. The $\mu$ in Equation (5) is used if it is desired to slow down the computation. If the computation is slowed down, it means that it will not converge as fast. The $\mu$ term dictates what percentage of the shape parameter difference is actually applied. Embodiments of the 3D shape parameter update module 160 converges the quickest when the user is moving their head in different head poses. One time when it may be desirable to slow down the computation is when the user is looking at the same point for a long time and not changing head pose.

The energy function of Equation (2) can be rewritten in the matrix form a vector of parameters is introduced that contains all optimized parameters, $p = [R(1), T(1), AU(1), \ldots, R(M), T(M), AU(M), s, SU]^T$, where M is a number of captured images in the batch of frames over which energy minimization is performed. The $R(k), T(k), AU(k)$, and SU are parameter vectors as defined above.

Therefore the energy function of Equation (3) in matrix form can be defined as:

$$E = \|S_{2D} - Proj(S_{3D}(p))\|_2^2 + w_2 \|depthZ - I_z p\|_2^2 + w_2 \|I_{AU} p\|_2^2 + w_3 \|SU_{old} - I_{SU} p\|_2^2 \quad (6),$$

Where:
$\|\cdot\|_2^2$—is squared L2 norm;
p—is a vector of optimized parameters of size $(6+Q) \times M + 1 + R$;
$S_{2D}$—is a vector with $2 \times N \times M$ elements that are 2D point coordinates produced by the 2D face alignment module 130 for all M captured images, x,y coordinates stacked in one column as $[x_1, y_1, \ldots, x_{2NM}, y_{2NM}]^T$;
$S_{3D}(p)$—is a vector with $3 \times N \times M$ elements that are 3D point coordinates. These points depend on parameters from p, x,y,z coordinates stacked in one column as $[x_1, y_1, z_1, \ldots, x_{2NM}, y_{2NM}, z_{2NM}]^T$;
$Proj(S_{3D})$—is a projection vector function that projects $S_{3D}(p)$ vector to 2D. Using Equation (3), this function is defined as:

$$Proj(S_{3D}) = \begin{bmatrix} Proj(S_1^{3D}(1)) \\ \vdots \\ Proj(S_N^{3D}(1)) \\ Proj(S_1^{3D}(2)) \\ \vdots \\ Proj(S_N^{3D}(2)) \\ \vdots \\ Proj(S_1^{3D}(M)) \\ \vdots \\ Proj(S_N^{3D}(M)) \end{bmatrix} \quad (7)$$

Equation (7) is the projection in matrix form, and the vector functions in vector form.

depthZ—is a vector of the same size as p with all entries set to 0 except for the entries which indexes correspond to the position of Tz in p. Those entries are set to be distances to the tracked head for corresponding captured images, as measured by a depth-sensing camera.

$SU_{old}$—is a vector of the same size as p with all entries set to 0 except for SU and scale part. Those entries are set to be currently known scale and SUs $I_z, I_{AU}, I_{SU}$—are square matrices with number of columns and rows to be the same as the dimension of the vector of parameters p and with all entries set to 0 except for the entries on the main diagonals which indexes correspond to indexes of $T_z$, AU, SU (includes scale) parameters in p. Those entries are set to 1.

Embodiments of the 3D shape parameter update module 160 use a modified Gauss-Newton method to minimize the energy function given in Equation (6) and to compute 3D head shape parameter updates. To do that, embodiments of the 3D shape parameter update module 160 take its $1^{st}$ order Taylor expansion around point $p_{start}$ as follows:

$$E = \left\|S_{2D} - Proj(S_{3D}(p_{start})) - \frac{\partial Proj(S_{3D}(p))}{\partial p} \Delta p \right\|_2^2 + \quad (8)$$
$$w_1 \|depthZ - I_z p_{start} - I_z \Delta p\|_2^2 + $$
$$w_2 \|I_{AU} p_{start} + I_{AU} \Delta p\|_2^2 + w_3 \|I_{SU} \Delta p\|_2^2,$$

where $p_{start}$ vector's elements $R(k), T(k), AU(k)$ are set to be $R, T, AU$ parameters input frame k and scale and SU elements are set to currently known scale and SU values ($SU_{old}$ in Equation (5)).

The energy function given by Equation (8) can be reformulated with residuals as follows:

$$E = \left\|Err2D - \frac{dProj(S_{3D}(p))}{dp} \Delta p \right\|_2^2 + \quad (9)$$
$$w_1 \|ErrZ - I_z \Delta p\|_2^2 + w_2 \|I_{AU} p_{start} + I_{AU} \Delta p\|_2^2 + w_3 \|I_{SU} \Delta p\|_2^2$$

where the derivative with regard to p in the $1^{st}$ term is equal to:

$$\frac{dProj(S_{3D}(p))}{dp} = \frac{\partial Proj(S_{3D})}{\partial S_{3D}} \frac{\partial S_{3D}}{\partial p} \quad (10)$$

The $1^{st}$ partial derivative has this form:

$$\frac{\partial Proj(S_{3D})}{\partial S_{3D}} = \left[\frac{\partial Proj(S_{3D})}{\partial S_1^{3D}(1)}, \ldots, \frac{\partial Proj(S_{3D})}{\partial S_N^{3D}(1)}, \ldots, \frac{\partial Proj(S_{3D})}{\partial S_1^{3D}(M)}, \ldots, \frac{\partial Proj(S_{3D})}{\partial S_N^{3D}(M)}\right] \quad (11)$$

Considering the definition of Proj( ) vector function as in Equation (7), embodiments of the 3D shape parameter computation method obtains the following block matrix as $$\frac{\partial Proj(S_{3D})}{\partial S_{3D}} : \frac{\partial Proj(S_{3D})}{\partial S_{3D}} = \quad (12)$$

$$\begin{bmatrix} \frac{\partial Proj(\partial S_1^{3D}(1))}{\partial S_1^{3D}(1)} & \cdots & 0 \\ \vdots & \ddots & \vdots \\ 0 & \cdots & \frac{\partial Proj(\partial S_N^{3D}(M))}{\partial S_N^{3D}(M)} \end{bmatrix}$$

where there are 2×3

$$\frac{\partial Proj(\partial S_i^{3D}(k))}{\partial S_j^{3D}(k)}$$

matrices on the main diagonal and all other elements are set to 0. Considering the definition of the perspective projection given in Equation (4), the diagonal 2×3 matrices are:

$$\frac{\partial Proj(\partial S_i^{3D}(k))}{\partial S_j^{3D}(k)} = \begin{bmatrix} \frac{f}{z} & 0 & -\frac{fx}{z^2} \\ 0 & -\frac{f}{z} & \frac{fy}{z^2} \end{bmatrix} \quad (13)$$

The $2^{nd}$ partial derivative has this form (each element is gradient vector):

$$\frac{\partial S_{3D}}{\partial p} = \left[\frac{\partial S_{3D}}{\partial AU(1)}, \frac{\partial S_{3D}}{\partial AU(2)}, \ldots, \frac{\partial S_{3D}}{\partial AU(M)}, \frac{\partial S_{3D}}{\partial SU}\right] \quad (14)$$

In matrix form, Equation (14) becomes:

$$\frac{\partial S_{3D}}{\partial p} = \begin{bmatrix} \frac{\partial S_{3D}(1)}{\partial AU(1)} & 0 & \cdots & 0 & \frac{\partial S_{3D}(1)}{\partial SU(1)} \\ 0 & \frac{\partial S_{3D}(2)}{\partial AU(2)} & 0 & \cdots & \frac{\partial S_{3D}(2)}{\partial SU(2)} \\ 0 & 0 & \ddots & 0 & \vdots \\ \vdots & \vdots & 0 & \frac{\partial S_{3D}(M)}{\partial AU(M)} & \frac{\partial S_{3D}(M)}{\partial SU(M)} \end{bmatrix} \quad (15)$$

where its block matrices are:

$$\frac{\partial S_{3D}(k)}{\partial AU(k)} = \begin{bmatrix} \frac{\partial S_1^{3D}(k)}{\partial \theta_x(k)} & \cdots & \frac{\partial S_1^{3D}(k)}{\partial AU_Q(k)} \\ \vdots & \ddots & \vdots \\ \frac{\partial S_N^{3D}(k)}{\partial \theta_x(k)} & \cdots & \frac{\partial S_N^{3D}(k)}{\partial AU_Q(k)} \end{bmatrix} \frac{\partial S_{3D}(k)}{\partial SU(k)} = \quad (16)$$

$$\begin{bmatrix} \frac{\partial S_1^{3D}(k)}{\partial s(k)} & \cdots & \frac{\partial S_1^{3D}(k)}{\partial SU_R(k)} \\ \vdots & \ddots & \vdots \\ \frac{\partial S_N^{3D}(k)}{\partial s(k)} & \cdots & \frac{\partial S_N^{3D}(k)}{\partial SU_R(k)} \end{bmatrix}$$

with their elements defined by taking partial derivatives of Equation (3) as:

$$\frac{\partial S_i^{3D}(k)}{\partial \theta_x(k)} = s\frac{\partial R}{\partial \theta_x} S_i^{model}(k); \frac{\partial S_i^{3D}(k)}{\partial \theta_y(k)} = s\frac{\partial R}{\partial \theta_y} S_i^{model}(k); \quad (17)$$

$$\frac{\partial S_i^{3D}(k)}{\partial \theta_z(k)} = s\frac{\partial R}{\partial \theta_z} S_i^{model}(k)$$

$$\frac{\partial S_i^{3D}(k)}{\partial T_x(k)} = [100]^T; \frac{\partial S_i^{3D}(k)}{\partial T_y(k)} = [010]^T; \quad (18)$$

$$\frac{\partial S_i^{3D}(k)}{\partial T_z(k)} = [001]^T$$

$$\frac{\partial S_i^{3D}(k)}{\partial AU_j(k)} = sR(k)A_{ij}; \frac{\partial S_i^{3D}(k)}{\partial s} = RS_i^{model}(k); \quad (19)$$

$$\frac{\partial S_i^{3D}(k)}{\partial SU_j} = sR(k)S_{ij}$$

where:
$S_i^{model}(k)$—is i-th point of the 3D mask in the model space (before rotation, translation and scale).

$$\frac{\partial R}{\partial \theta_x}, \frac{\partial R}{\partial \theta_y}, \frac{\partial R}{\partial \theta_z}$$

—derivatives of the rotation matrix with regard to Euler angles and can be trivially derived from the Euler rotation matrix;

$A_{ij}, S_{ij}$—are the j-th animation and shape deformation basis vector and shape deformation basis vector for i-th vertice (they consists of X,Y,Z components)

The derivative of Equation (10) can be now written as a block matrix with 2×N×M rows (number of 2D point coordinates) and (6+Q)×M+1+R columns (number of estimated parameters), as:

$$SD = \frac{d Proj(S_{3D}(p))}{dp} \quad (20)$$

-continued $$= \begin{bmatrix} SD_{RTAU}(1) & 0 & 0 & 0 & SD_{SU}(1) \\ 0 & SD_{RTAU}(2) & 0 & \ldots & SD_{SU}(2) \\ 0 & 0 & \ddots & 0 & \vdots \\ \vdots & \vdots & 0 & SD_{RTAU}(M) & SD_{SU}(M) \end{bmatrix}$$

where:

$$SD_{RTAU}(k) = \frac{\partial Proj(\partial S_{3D}(k))}{\partial S_{3D}(k)} \frac{\partial S_{3D}(k)}{\partial AU(k)}; \quad (21)$$

$$SD_{SU}(k) = \frac{\partial Proj(\partial S_{3D}(k))}{\partial S_{3D}(k)} \frac{\partial S_{3D}(k)}{\partial SU(k)};$$

Here the projection matrix derivatives are block diagonal (see Equation (12)) with 2×N rows and 3×N columns. 3D shape derivatives have 3×N rows and either 6+Q columns (with regard to RTAU parameters) or 1+R columns (with regard to SU parameters).

The energy function given by Equation (9) can now be reformulated as follows:

$$E = \|Err2D - SD\Delta p\|_2^2 + w_1\|ErrZ - I_z\Delta p\|_2^2 + w_2\|I_{AU}p_{start} + I_{AU}\Delta p\|_2^2 w_3\|I_{SU}\Delta p\|_2^2 \quad (22)$$

In order to minimize this energy, embodiments of the 3D shape parameter update module 160 take its derivative with regard to $\Delta p$, set it equal to zero, and then solve for $\Delta p$. This yields the following (assuming that a L2 norm is used):

$$\frac{dE}{dp} = -2SD^T(Err2D - SD\Delta p) - 2w_1 I_z^T(ErrZ - I_z\Delta p) + \quad (23)$$

$$2w_2 I_{AU}^T(I_{AU}p_{start} + I_{AU}\Delta p) + 2w_3 I_{SU}^T I_{SU}\Delta p$$

$$= 0$$

Considering that $I_z^T I_z = I_z$, $I_{AU}^T I_{AU} = I_{AU}$, $I_{SU}^T I_{SU} = I_{SU}$, this can be simplified to:

$$(SD^TSD + w_1 I_z + w_2 I_{AU} + w_3 I_{SU})\Delta p = SD^T Err2D + w_1 I_z^T ErrZ - w_2 I_{AU}p_{start} \quad (24)$$

Or, in another form:

$$\Delta p = H^{-1} SDErr \quad (25),$$

where H is a Hessian and SDErr is a steepest descent matrix defined as:

$$H = SD^TSD + w_1 I_z + w_2 I_{AU} + w_3 I_{SU} \quad (26)$$

$$SDErr = SD^T Err2D + w_1 I_z^T ErrZ - w_2 I_{AU}p_{start} \quad (27).$$

Equation (25) is how embodiments of the 3D shape parameter computation method obtain the update of SU (or $\Delta p$) from the matrix in Equation (20) (SD). Equation (26) is the Hessian that is formed that is the SD transpose matrix multiplied by itself, plus the constraints in the energy function.

Note that in Equations (25) and (26) the Hessian is used. In mathematics, the Hessian matrix (or Hessian) is the square matrix of second-order partial derivatives of a function. In other words, the Hessian describes the local curvature of a function of many variables.

Note that the SD is defined by Equation (20). $SD^TSD$—is a symmetric sparse and mostly diagonal matrix. It should be noted that:

$$SD^TSD = = \begin{bmatrix} SD_{RTAU}(1)^T SD_{RTAU}(1) & 0 & 0 & 0 & SD_{RTAU}(1)^T SD_{SU}(1) \\ 0 & SD_{RTAU}(2)^T SD_{RTAU}(2) & 0 & \ldots & SD_{RTAU}(2)^T SD_{SU}(2) \\ 0 & 0 & \ddots & 0 & \vdots \\ \vdots & \vdots & 0 & SD_{RTAU}(M)^T SD_{RTAU}(M) & SD_{RTAU}(M)^T SD_{SU}(M) \\ SD_{SU}(1)^T SD_{RTAU}(1) & SD_{SU}(2)^T SD_{RTAU}(2) & \ldots & SD_{SU}(M)^T SD_{RTAU}(M) & \sum_{k=1}^{M} SD_{SU}(k)^T SD_{SU}(k) \end{bmatrix} \quad (28)$$

$$SD^T Err2D = \begin{bmatrix} SD_{RTAU}(1)^T ErrZ(1) \\ \vdots \\ SD_{RTAU}(M)^T ErrZ(M) \\ \sum_{k=1}^{M} SD_{SU}(k)^T ErrZ(k) \end{bmatrix} \quad (29)$$

Constraint weights $w_1$, $w_2$, $w_3$ can be chosen by using the residuals of the energy terms. Embodiments of the 3D shape parameter update module 140 can estimate standard deviations of the main and constraint terms residuals and set weights equal to $$w_i = \frac{\sigma_{main\ term}^2}{\sigma_{i\text{-}th\ constraint}^2}.$$

This normalizes the energy terms and avoids ill-conditioned Hessians. The weight of the main term is equal to 1 in this case.

Embodiments of the 3D shape parameter update module 160 can either use Equation (25) to compute parameter updates, or, in some embodiments, can solve Equation (24) directly without inversing the Hessian. Once the $\Delta p$ parameter updates are computed, embodiments of the module 160 take the scale and the SU portion of $\Delta p$ vector and update the previous (or old) scale and shape units based on the following formula:

$$SU_{new} = SU_{old} + \mu \Delta SU \quad (29),$$

where $\mu$ is an update weight that takes values in 0 ... 1 range. This provides the first set of 3D shape parameters for the first batch of frames.

Embodiments of the 3D shape parameter update module 160 then repeat the process set forth above for subsequent batches of frames. Each batch of frames is later in time than the previous batch of frames. Embodiments of the module 160 then compute an updated 3D head shape parameter by adding the 3D head shape parameter update to the current 3D head shape parameters (box 350).

III.C. Modified Gauss-Newton Minimization Technique

Embodiments of the 3D shape parameter computation system 100 and method use a modified Gauss-Newton minimization technique to minimize the energy function, as set forth above. In standard Gauss-Newton minimization, the technique iterates multiple times to converge to a solution. In order to find new SUs for a given batch of frames, the standard technique would compute the update of the SUs, (or $\Delta p$), several times until it converged to a solution. The standard Gauss-Newton then would update the SUs using Equation (29) for each computed $\Delta p$. In other words, there would be several iterations for each batch of frames.

The first iteration of the Gauss-Newton minimization technique mostly yields the minima considering the shape of the energy function. In addition, iterating the Gauss-Newton until convergence requires re-computing matrices as described above, which is quite expensive since it requires re-computing the Hessian. Moreover, the current batch of frames may not contain the most representative set of frames by solving such that the perfect SU and scale parameters are found. Thus, iterating Gauss-Newton until convergence in many cases may be a waste of time. Finally, SU and scale updates computed from a current batch of frames bring the solution "closer" to the "perfect" set of shape parameters. If they are unique, then embodiments of the method can move even closer by processing the next batch which may bring new information.

The modified Gauss-Newton minimization technique used by embodiments of the 3D shape parameter computation method shortcuts this process by observing that the first iteration produces the $\Delta p$ update that "walks" to nearly the end of the problem. Thus, subsequent iterations change the SUs very little, but take the same amount of time to compute. This allows the modified Gauss-Newton minimization technique to be 2 to 5 times faster than the standard Gauss-Newton minimization technique.

IV. Exemplary Operating Environment

Figure 4:
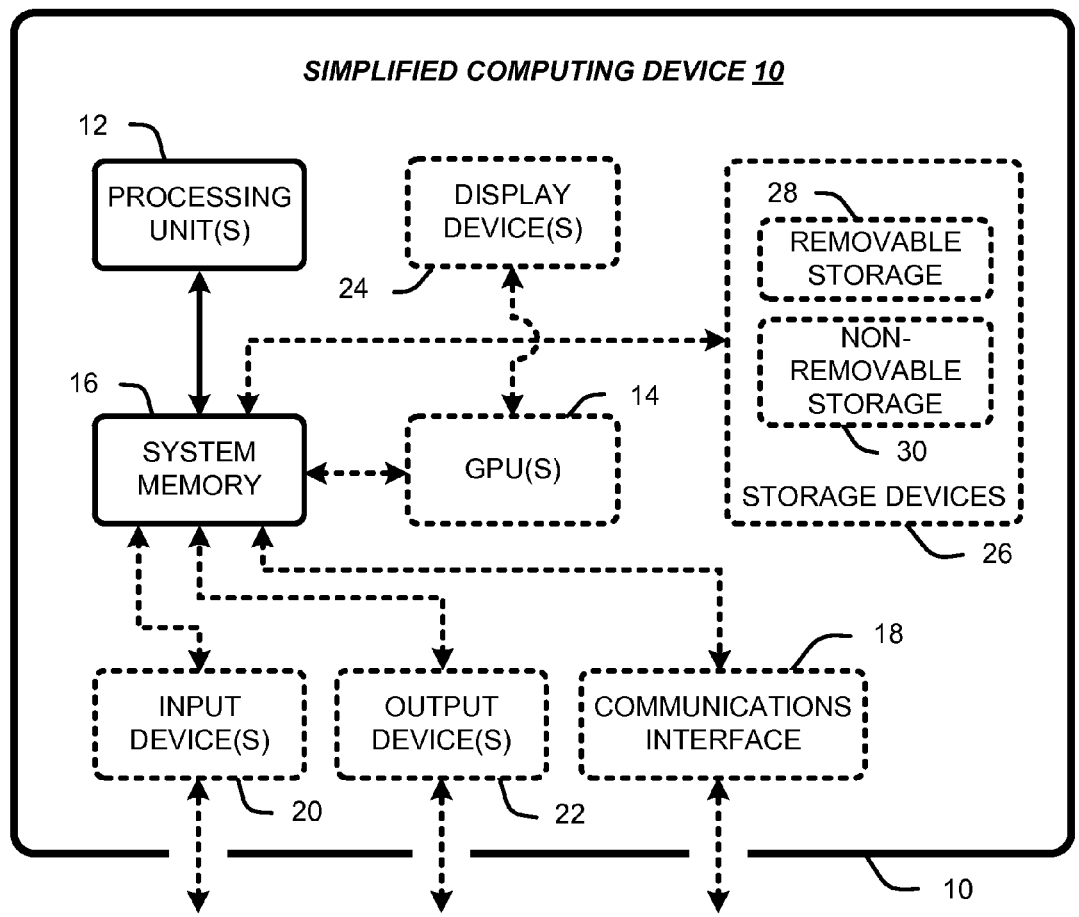
FIG. 4 illustrates a simplified example of a general-purpose computer system on which various embodiments and elements of the 3D shape parameter computation system and method, as described herein and shown in FIGS. 1-3, may be implemented.

Embodiments of the 3D shape parameter computation system 100 and method described herein are operational within numerous types of general purpose or special purpose computing system environments or configurations. FIG. 4 illustrates a simplified example of a general-purpose computer system on which various embodiments and elements of the 3D shape parameter computation system 100 and method, as described herein and shown in FIGS. 1-3, may be implemented. It should be noted that any boxes that are represented by broken or dashed lines in FIG. 4 represent alternate embodiments of the simplified computing device, and that any or all of these alternate embodiments, as described below, may be used in combination with other alternate embodiments that are described throughout this document.

For example, FIG. 4 shows a general system diagram showing a simplified computing device 10. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement embodiments of the 3D shape parameter computation system 100 and method described herein, the device should have a sufficient computational capability and system memory to enable basic computational operations. In particular, as illustrated by FIG. 4, the computational capability is generally illustrated by one or more processing unit(s) 12, and may also include one or more GPUs 14, either or both in communication with system memory 16. Note that that the processing unit(s) 12 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 4 may also include other components, such as, for example, a communications interface 18. The simplified computing device of FIG. 4 may also include one or more conventional computer input devices 20 (e.g., pointing devices, keyboards, audio input devices, video input devices, haptic input devices, devices for receiving wired or wireless data transmissions, etc.). The simplified computing device of FIG. 4 may also include other optional components, such as, for example, one or more conventional computer output devices 22 (e.g., display device(s) 24, audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device of FIG. 4 may also include a variety of computer readable media. Computer readable media can be any available media that can be accessed by computer 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the 3D shape parameter computation system 100 and method described herein, or portions thereof, may be stored, received, transmitted, or read from any desired combination of computer or machine readable media or storage devices and communication media in the form of computer executable instructions or other data structures.

Finally, embodiments of the 3D shape parameter computation system 100 and method described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

Moreover, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented by one or more computing devices, the method comprising:
   obtaining an input frame of a user's face;
   fitting two-dimensional feature points to the user's face in the input frame;
   generating a batch of frames that includes the input frame;
   constructing an energy function that includes the two-dimensional feature points and other two-dimensional feature points, three-dimensional head shape parameters, three-dimensional head pose parameters, and three-dimensional facial expression parameters for individual frames of the batch of frames;
   solving the energy function to obtain a three-dimensional head shape parameter update; and
   determining a three-dimensional shape of the user's face using the three-dimensional head shape parameter update.

2. The method of claim 1, wherein the batch of frames contains a plurality of frames of the user's face over time in different head poses and facial expressions such that the batch of frames contains head pose diversity and facial expression diversity.

3. The method of claim 2, wherein the batch of frames does not contain the user's face in a neutral expression.

4. The method of claim 1, wherein the three-dimensional head shape parameter update is valid for the batch of frames.

5. The method of claim 1, wherein the energy function further includes a difference between the two-dimensional feature points and a projected three-dimensional head model of the user's face.

6. The method of claim 1, further comprising allowing the two-dimensional feature points, the other two-dimensional feature points, the three-dimensional head pose parameters, and the three-dimensional facial expression parameters to vary for the individual frames in the batch of frames.

7. The method of claim 1, further comprising minimizing the energy function to solve for the three-dimensional shape parameter update.

8. The method of claim 7, further comprising minimizing the energy function using a modified Gauss-Newton minimization technique that performs a single iteration to minimize the energy function to solve for the three-dimensional head shape parameter update.

9. The method of claim 1, further comprising adding depth information to the two-dimensional feature points, where the depth information is obtained from a depth-sensing camera that determines a distance from the depth-sensing camera to the user's face.

10. A system comprising:
    one or more processing units; and
    a storage device storing computer-executable instructions which, when executed by the one or more processing units, cause one or more processing units to:
      obtain a batch of frames of a face of a user;
      construct an energy function that includes, for individual frames of the batch of frames, two-dimensional feature points of the face and three-dimensional head shape parameters of the user, the two-dimensional feature points being represented in two-dimensional coordinates;
      solve the energy function to determine a shape parameter update to the three-dimensional head shape parameters, the shape parameter update representing a difference between the three-dimensional head shape parameters and updated three-dimensional head shape parameters for the batch of frames; and
      determine a three-dimensional shape of the face using the updated three-dimensional head shape parameters.

11. The system of claim 10, wherein the computer-executable instructions further cause the one or more processing units to mix the shape parameter update and the three-dimensional head shape parameters to obtain the updated three-dimensional head shape parameters.

12. The system of claim 10, wherein the computer-executable instructions further cause the one or more processing units to repeatedly determine subsequent shape parameter updates for subsequent batches of frames.

13. The system of claim 12, wherein the computer-executable instructions further cause the one or more processing units to repeatedly determine the subsequent shape parameter updates until subsequently updated three-dimensional head shape parameters are constant.

14. The system of claim 12, wherein the computer-executable instructions further cause the one or more processing units to repeatedly determine the subsequent shape parameter updates until a particular shape parameter update reaches a threshold.

15. A computer-readable hardware memory device or hardware storage device storing computer-readable instructions that, when executed by one or more processing units, cause the one or more processing units to perform acts comprising:
    obtaining a batch of frames of a face of a user;
    constructing an energy function that includes, for individual frames of the batch of frames, two-dimensional feature points of the face and three-dimensional head shape parameters of a head of the user, the two-dimensional feature points being represented in two-dimensional coordinates;

solving the energy function to determine a shape parameter update to the three-dimensional head shape parameters, the shape parameter update representing a difference between the three-dimensional head shape parameters and updated three-dimensional head shape parameters for the batch of frames; and determining a three-dimensional shape of the face using the updated three-dimensional head shape parameters.

16. The computer-readable hardware memory device or hardware storage device of claim 15, wherein the three-dimensional head shape parameters are valid for each frame of the batch of frames.

17. The computer-readable hardware memory device or hardware storage device of claim 16, wherein the two-dimensional feature points vary for at least some of the frames of the batch of frames.

18. The computer-readable hardware memory device or hardware storage device of claim 15, the acts further comprising repeatedly obtaining subsequent batches of frames, repeatedly constructing subsequent energy functions, and solving the subsequent energy functions for further updated three-dimensional head shape parameters.

19. The computer-readable hardware memory device or hardware storage device of claim 15, wherein the three-dimensional head shape parameters include a three-dimensional shape of a head of the user.

20. The computer-readable hardware memory device or hardware storage device of claim 15, the acts further comprising providing the three-dimensional shape of the face to a face tracking system.

* * * * *